(12) United States Patent
Ambartsoumian

(10) Patent No.: US 10,577,138 B2
(45) Date of Patent: Mar. 3, 2020

(54) CRYOGENIC-SEALING TAPE AND METHOD OF USE

(71) Applicant: Gourgen Ambartsoumian, Laval (CA)

(72) Inventor: Gourgen Ambartsoumian, Laval (CA)

(*) Notice: Subject to any disclaimer, the term of this patent is extended or adjusted under 35 U.S.C. 154(b) by 293 days.

(21) Appl. No.: 15/497,882

(22) Filed: Apr. 26, 2017

(65) Prior Publication Data

US 2017/0312991 A1    Nov. 2, 2017

Related U.S. Application Data

(60) Provisional application No. 62/329,275, filed on Apr. 29, 2016.

(51) Int. Cl.
| | |
|---|---|
| *B32B 41/00* | (2006.01) |
| *B65B 17/00* | (2006.01) |
| *C09J 7/10* | (2018.01) |
| *G09F 3/04* | (2006.01) |

(52) U.S. Cl.
CPC ............... *B65B 17/00* (2013.01); *C09J 7/10* (2018.01); *G09F 3/04* (2013.01); *C09J 2483/00* (2013.01)

(58) Field of Classification Search
CPC ......... B65B 17/00; C09J 7/10; C09J 2483/00; G09F 3/04
USPC ........................... 156/64, 350, 351, 378, 379
See application file for complete search history.

(56) References Cited

U.S. PATENT DOCUMENTS

| | | | |
|---|---|---|---|
| 5,691,018 A * | 11/1997 | Kelley | ............... B05B 13/0228 |
| | | | 428/36.8 |
| 5,836,618 A | 11/1998 | Perlman | |
| 6,703,120 B1 * | 3/2004 | Ko | ........................ C09J 183/04 |
| | | | 428/355 R |
| 7,108,909 B1 | 9/2006 | Perlman et al. | |

* cited by examiner

*Primary Examiner* — Michael N Orlando
*Assistant Examiner* — Joshel Rivera
(74) *Attorney, Agent, or Firm* — Norton Rose Fulbright Canada LLP

(57) ABSTRACT

Use of a combination of a sealing tape, cap and container for sealed storage of a sample at −70° C. or below. A container receives sample for subsequent storage of the sample at −70° C. or below. A cap encloses the sample in the container for subsequent storage of the sample at −70° C. or below, a joint defined between the cap and the container. A sealing tape sealingly covers said joint between the cap and the receptacle during storage of the sample at −70° C. or below, the sealing tape comprising a strip body having a first surface and a second surface, the first surface and the second surface being made of one of a silicone and a silicone rubber, a thickness between the first surface and the second surface ranging between 0.5 mil-60.0 mil, the strip body configured for the first surface at a first end to self-adhere to the second surface at a second end by overlaying in a silicone-to-silicone bond to cover said joint.

21 Claims, 8 Drawing Sheets

CRYOGENIC-SEALING TAPE AND METHOD OF USE

CROSS-REFERENCE TO RELATED APPLICATION

The present application claims priority on U.S. Patent Application Ser. No. 62/329,275, filed on Apr. 29, 2016 and incorporated herein by reference.

FIELD OF THE INVENTION

The present application relates to sealing and identification of vials and containers for cryogenic storage at −70° C. or below.

BACKGROUND OF THE ART

It is routine practice in biotechnology and biomedical laboratories to store cell lines, DNA libraries, tissues, viruses, bacteria, fungi and other biological specimens, biochemical agents, blood and body fluids in cryogenic and freezing environments for the purpose of better preservation for extended periods of time, up to 15-20 years or more. In the biomedical and biotechnology fields, proper and secure labelling and identification of containers and objects carrying these types of biological substances are pivotal for daily research and clinical operations. Other industries also require labelling of containers and objects that must be frozen or labelling of already frozen surfaces such as liquefied gas pipes and transportation pipelines and objects in a freezer.

There are cryogenic adhesive labels available which can be printed with various types of printers. Thermoplastic labels for cryogenic storage containers which can be inscribed by various writing instruments and/or printed in laser printers are described, for example, in U.S. Pat. Nos. 5,836,618 or 7,108,909. One of the issues associated with cryogenic pressure-sensitive labels is that they are not effective when applied onto frozen surfaces for example vials, boxes, cans or other containers, or when below low temperature limits. It is a well known fact that adhesive labels do not adhere well to cold surfaces. Cryogenic labels such as 3M label material 7604FP in manufacturer's datasheet specify that "Low temperature surfaces, below 50 F (10 C), cause adhesive to become firm and will not allow to develop intimate adhesive contact". Even the efforts to wipe off the condensation prior applying the label do not allow proper label adhesion. As a result the labels do not adhere to frozen container and detach immediately or shortly after the adhesion. The prior art of identification of cryogenic containers is related to adhesive labels.

Very often it is required to label or re-label vials and other containers which are already stored in cryogenic or freezer environment such as liquid or vapour phase liquid nitrogen, freezer, dry ice, Alcohol-dry-ice bath and other low temperature conditions when the container has a surface temperature around −70° C. or well below. Applying an adhesive label or a tape to frozen surface is significantly different from applying them at room temperature. As a matter of fact the surface temperature is determinative as to whether the adhesive will succeed or fail. For a long time this problem has not been solved. Sealing and labeling of frozen containers is a problematic procedure due to the fact that the adhesive labels and tapes cannot stick to frozen surfaces, as the adhesive and the material properties change in such low temperatures. For example, many thermoplastic films such as vinyl, polypropylene, polyethylene, polyester, polystyrene, etc. become brittle and crack in cryogenic temperatures. There is a wide variety of containers used in laboratories including but not limited to vials, tubes, polycons, culture plates, racks, canes, goblets, plastic bags, blood bags, IV bags, bottles, flasks, microscope slides, boxes, cassettes, tubing and hoses, etc.

Often samples are stored inside screw-cap vials inside cryogenic boxes supported by racks (metal or plastic), in the liquid phase of liquid nitrogen. It is known that liquid nitrogen can penetrate the vials through bypassing the cap threads or sealing rings of the vial caps. As a result the liquid nitrogen can be a carrier of contaminants and cross contaminate samples inside the liquid nitrogen tank.

Another negative aspect of using adhesive labels is some low level toxicity of adhesives that can accumulate inside liquid nitrogen tank. There may be some concerns that the adhesive toxicity might have some effect on biological materials in cryo storage.

Yet another important aspect of sample storage or storage of other sterile solutions, cell growth media and liquids is to avoid contamination. As a standard operating procedure in cell culture labs and other types of labs the containers or certain parts thereof (caps, stoppers, bottles or even entire container) are sprayed with alcohol or other disinfectants. It prevents contamination for a short period but the contamination may happen after the evaporation of the disinfectant.

The challenge is that many material properties are affected when they become wet with alcohols and solvents, e.g., adhesives cannot stick to wet alcohol surface on the vials, or siliconized containers or oily surfaces. Other chemicals also affect surface adhesion.

Yet another important issue is that adhesives do not stick well to metal containers inside freezers or liquid nitrogen storage. The vast majority of cryo labels will fall off if they are applied to metal with a subsequent storage inside −70° C. freezer or liquid nitrogen. Furthermore, labelling of a frozen metal is a challenge in the biopreservation industry because properties of a frozen metal are different compared to properties of a frozen plastic. Labelling of frozen metal may be more difficult compared to frozen plastic labelling. Cryogenic temperatures may make materials brittle and crack.

SUMMARY

It is therefore an aim of the present disclosure to provide a cryogenic-sealing tape that can be used for sealing and identification of containers for subsequent storage in temperatures around −70° C. or below.

It is a further aim of the present disclosure that the cryogenic-sealing tape be usable inside liquid nitrogen storage.

Yet another aim of the present disclosure is that cryogenic-sealing tape be dispensable in automatic applicators.

Yet another aim of the present disclosure is providing a kit comprising a cryogenic-sealing tape and a wireless communication tag or device such as a Radio Frequency Identification Tag (RFID) or a Near Field Communication tag (NFC).

Yet another aim of the present disclosure is the method of using cryogenic-sealing tape with a Radio Frequency Identification Tag (RFID) or a Near Field Communication tag (NFC).

Therefore, in accordance with the present disclosure, there is provided a cryogenic sealing tape for exposure to −70° C. or below while sealing a joint of a container, the cryogenic sealing tape comprising a strip body having a first surface and a second surface, the first surface and the second surface being made of one of a silicone and a silicone rubber, a thickness between the first surface and the second surface ranging between 0.5 mil-60.0 mil, the strip body configured for the first surface at a first end to self-adhere to the second surface at a second end by overlaying in a silicone-to-silicone bond, the strip body further configured for the second surface at the first end to self-adhere to the first surface at the second end by overlaying in a silicone-to-silicone bond.

In accordance with a further embodiment of the present disclosure, there is provided a use of a combination of a sealing tape, cap and container for sealed storage of a sample at −70° C. or below, the use comprising: a container for receiving a sample for subsequent storage of the sample at −70° C. or below; a cap for enclosing the sample in the container for subsequent storage of the sample at −70° C. or below, a joint defined between the cap and the container; and a sealing tape for sealingly covering said joint between the cap and the receptacle during storage of the sample at −70° C. or below, the sealing tape comprising a strip body having a first surface and a second surface, the first surface and the second surface being made of one of a silicone and a silicone rubber, a thickness between the first surface and the second surface ranging between 0.5 mil-60.0 mil, the strip body configured for the first surface at a first end to self-adhere to the second surface at a second end by overlaying in a silicone-to-silicone bond to cover said joint.

In accordance with a still further embodiment of the present disclosure, there is provided a method for sealing a joint for exposure to an environment of 70° C. or below, comprising: obtaining a sealing tape comprising a strip body having a first surface and a second surface, the first surface and the second surface being made of one of a silicone and a silicone rubber, a thickness between the first surface and the second surface ranging between 0.5 mil-60.0 mil; placing a first end of the strip body against a joint to be sealed; wrapping and stretching the strip body around the joint to be sealed; forming a silicone-to-silicone bond by overlaying the second surface at a second end onto the first surface at the first end, whereby the strip body self-adheres to itself while stretched to cover said joint; and exposing the sealing tape covering the joint to said environment of 70° C. or below, whereby the sealing tape seals the joint in said environment of 70° C. or below, the sealing tape maintaining its sealing integrity in said environment of 70° C. or below.

DETAILED DESCRIPTION

Figure 1A:
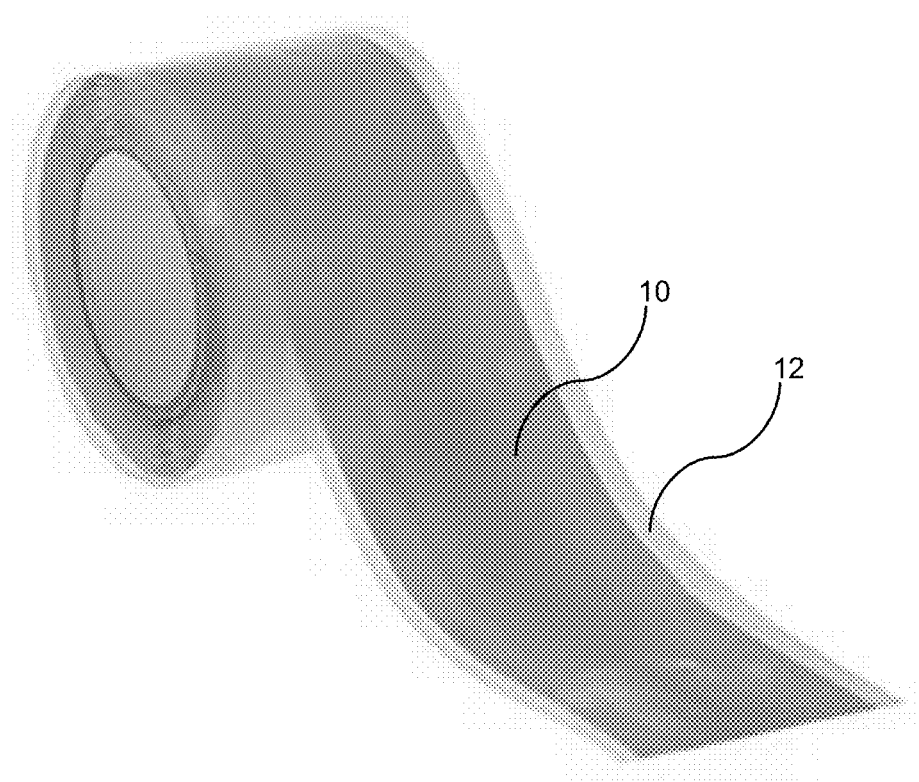
FIG. 1A is a perspective view of cryogenic-seal tape in accordance with the present disclosure, in a roll on a backing strip.

Referring to the Figures, there is illustrated a cryogenic-sealing tape 10 in accordance with the present disclosure. The tape 10 may be a monolithic and/or a continuous tape, made of silicone or silicone rubber. Silicone rubber is an elastomer (rubber-like material) composed of silicone—itself and/or a polymer—containing silicon together with carbon, hydrogen, and oxygen. Silicone rubbers are often one- or two-part polymers, and may contain fillers to improve properties. For the purpose of the present disclosure the word silicone will imply a material containing silicon and/or any mixture of silicone rubber. The present disclosure is based on the properties of silicone and silicone-rubber materials to stretch and bond to itself. The present disclosure also covers the non-continuous sectioned portions of the self-fusing silicone and silicone-rubber. The material may be provided on a backing strip (support liner) or on any specially coated surface to prevent the tape from sticking to itself. The material can be provided in any format including but not limited to individual piece, sheet, stripe, roll, fanfold or other. One essential property of the silicone is that it adheres to itself. When two layers of the tape 10 are overlaid, with a slight pressure being applied, the overlaid layers of the tape 10 fuse and become integral. The adhesion therebetween is dry, in that no adhesive of any sort needs to be applied to cause the adhesion. By having the tape in a monolithic configuration, both sides of the tape 10 are silicone or silicone rubber, and therefore self-adhering (a.k.a., self-fusing, self-amalgamating). Although described as monolithic, the tape 10 may have a composite construction, or may have a core covered by the silicone or silicone rubber.

The tape 10 may come in substantial length, for a limited thickness and width. As explained below, the thickness is selected such that the tape 10 has some elasticity when manually pulled or stretched. According to an embodiment, a suitable thickness range is between 0.5 mil-60.0 mil (0.0127 mm-1.524 mm). With such thickness, the tape 10 may be ripped manually or easily cut off as in FIG. 1B, for instance when a sufficient length of tape 10 has been unrolled.

The width may depend on the application with which the tape 10 is used, and more particularly on the diameter or like cross-sectional dimensions of the vials and containers. It is indeed desired that the width of tape 10 overlap both sides of a sealed joint. According to an embodiment, the width may range between ¼" to 2½" when used to seal joints. It is also contemplated to use the tape 10 to wrap objects, in which case the width can be between 2" and 6". These dimensional ranges are provided as an example only, and should be interpreted non-limitatively as convenient and practical dimensions for the contemplated use. Wrapping of more than one object is possible such as multiple tubes, multiple cables, multiple pipes, etc. Furthermore, a single piece of the cryogenic-sealing tape 10 or separate pieces of the tape 10 fused together may be used.

Figure 1B:
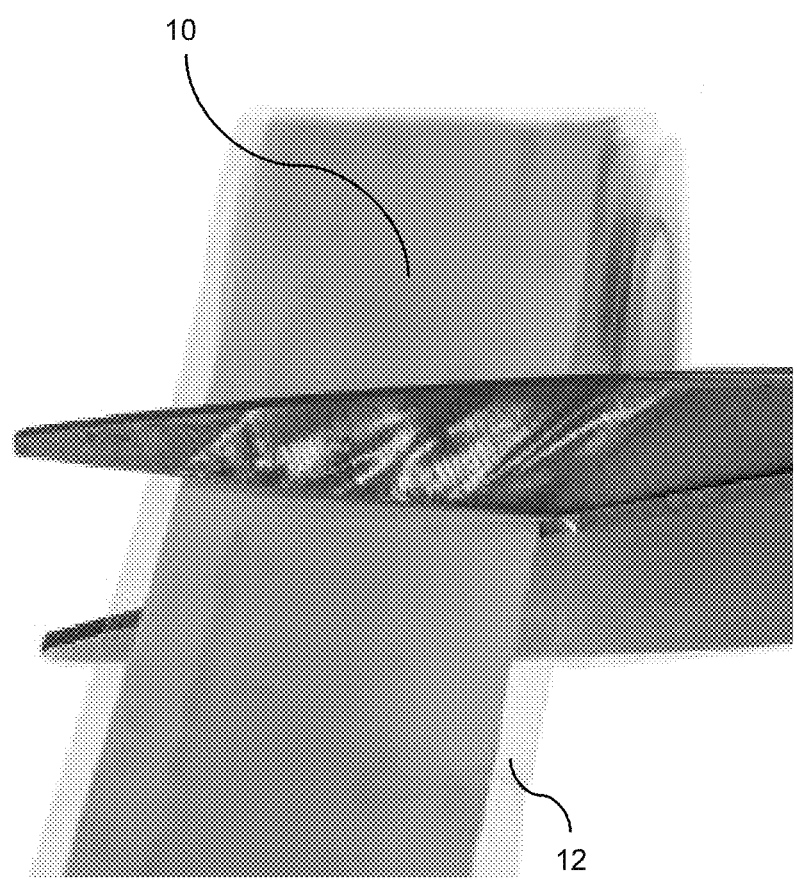
FIG. 1B is a perspective view of the cryogenic-seal tape as being cut from the roll.
Figure 1C:
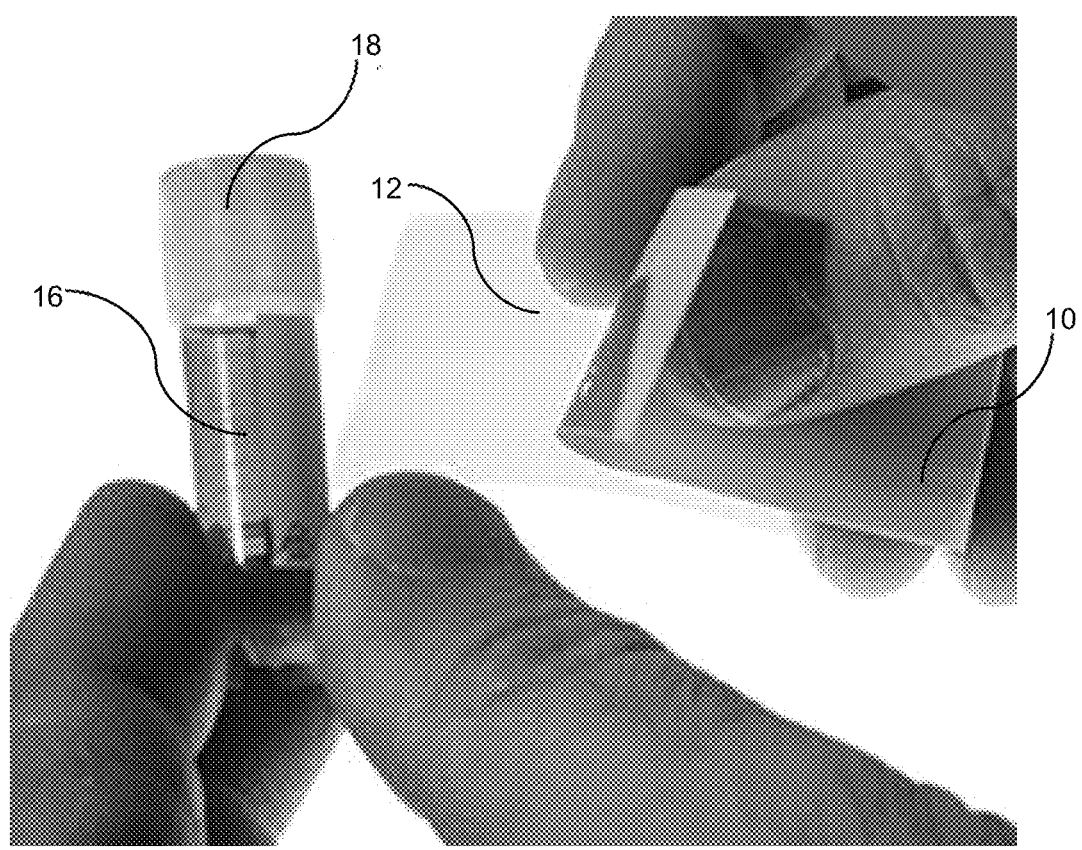
FIG. 1C is a perspective view of the cryogenic-seal tape as being detached from the backing strip.

As shown in FIG. 1A, the tape 10 may come as a roll. In such arrangement, a backing strip 12 may be applied to one of the surfaces of the tape 10, to protect the tape 10 from sticking to itself with its self-adhering properties. An applicator device may be used if desired to facilitate the dispensing and separation of a strip of the tape 10 with backing layer 12 from the roll. According to an embodiment, the length should be sufficient to reach the other end of the material upon stretching.

Figure 1D:
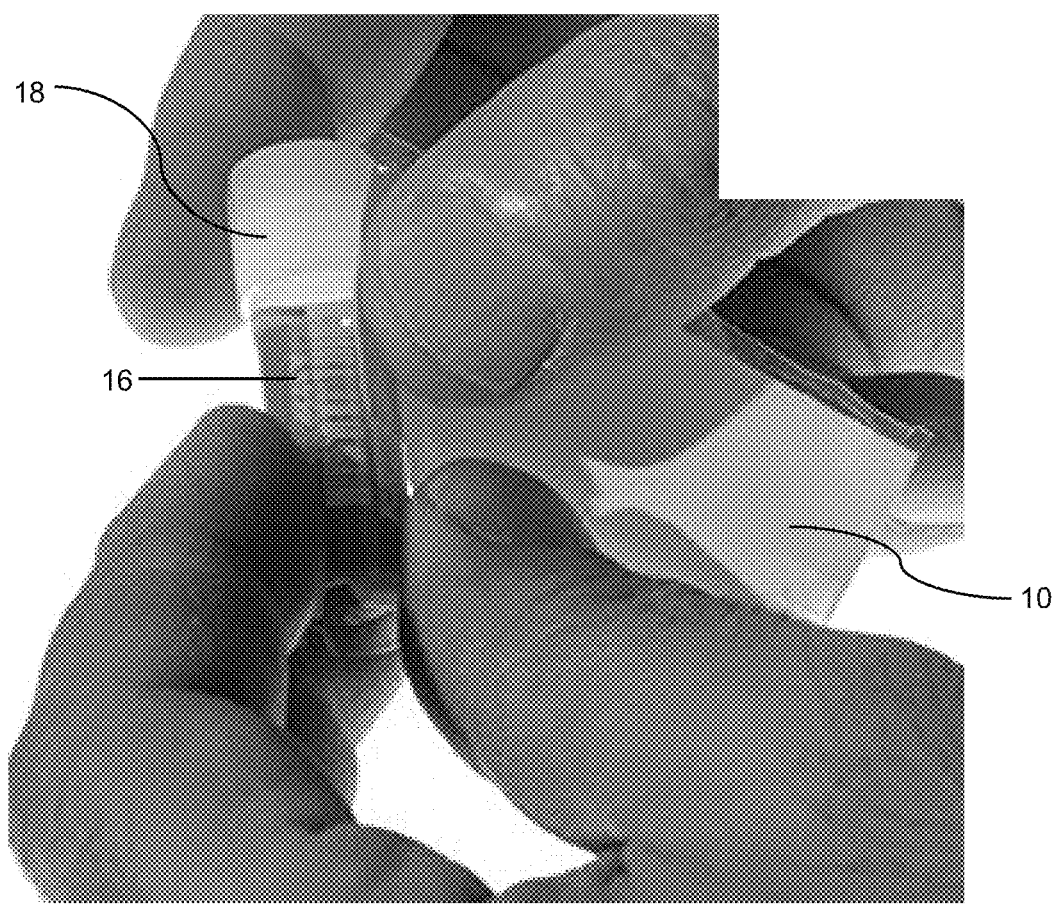
FIG. 1D is a perspective view of the cryogenic-seal tape having a first end applied to a container.

When a strip of the tape 10 of suitable length has been obtained, the backing 12 may be removed. The tape 10 may come in pre-cut strips, or may be cut off or ripped from the roll, as in FIG. 1B. The tape 10 may therefore be applied to the container 16. As shown in FIG. 10, the tape 10 is used to seal the joint between the cap 18 and the container 16. A first end of the tape 10 is firstly positioned on the joint, as in FIG. 1D. The length of the tape 10 is then disposed onto the circumference of the joint, covering it on both sides.

Figure 1E:
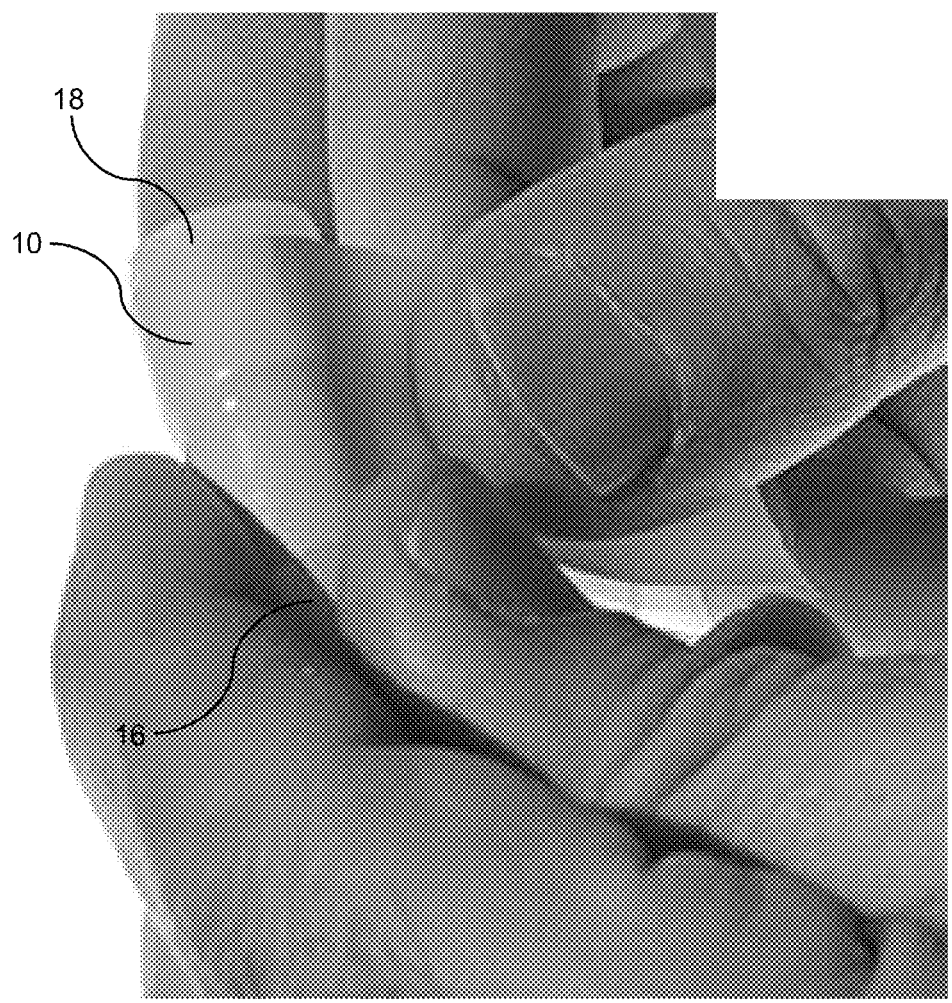
FIG. 1E is a perspective view of the cryogenic-seal tape disposed on a joint between the container and a cap thereof.
Figure 1F:
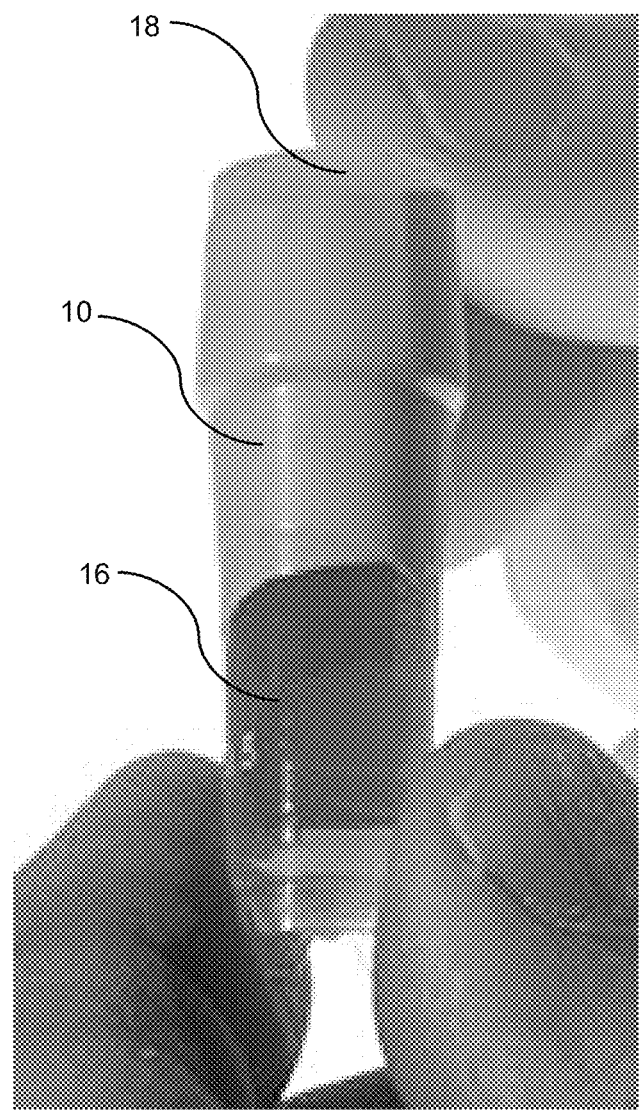
FIG. 1F is a perspective view of the cryogenic-seal tape sealing the joint of FIG. 1E and ready for cryogenic storage.

As shown in FIG. 1E, the tape 10 is hence applied onto the joint, but before the free end of the tape 10 is overlaid onto the applied end of the tape 10, the user exerts some pull on the free end of the tape 10 to stretch it, to remove any folds or the presence of air bubbles. Therefore, when the tape 10 is overlaid on itself, as in FIG. 1F, it is in a stretched condition. The tape 10 creates a non-penetrable barrier to liquid nitrogen (and its vapor phase resulting from evaporation—−196 C to −100 C for example) and can protect samples against contamination. The stretching adds elasticity to the formed seal, by which it biases itself onto the container 16 and cap 18. The fusion after stretching and inherent coefficient of friction of silicone ensure that the formed seal of tape 10 remains in position, instead of sliding off. It is observed that a first side of the strip of tape 10 is overlaid onto a second side of the strip of tape 10: as the tape 10 is of monolithic construction, both sides have the self-fusing properties. Therefore, it is non-directional and reversible, such that the first surface at a first end of the strip of tape 10 self-adheres to the second surface at a second end by overlaying, or the second surface at the first end self-adheres to the first surface at the second end by overlaying. The fusion may be permanent and may not be undone without ripping it apart. While the method illustrated is not illustrated in FIGS. 1A-1F as being performed on a cryogenically frozen container, the same steps may apply if the container 16 and cap 18 are taken out of cryogenic storage and are at −70 C or below, with efficient sealing at least up to −196 C. However, the user must take the necessary precautions (e.g., wearing protective gear) to manipulate the frozen objects. If desired, the user may inscribe information on the tape 10, whether it be before applying it to the container 16 or after it has been applied. Indeed, the material of the tape 10 will retain marker ink thereon. Any form of printer may be used to print information, or markers such as permanent ink markers.

Other sequences may also be used. For instance, the tape 10 may be ripped from the roll when overlaying it onto itself to form the seal around the joint of the container. Also, even though the method of FIGS. 1A-1F show the tape 10 as being applied to a joint between container 16 and cap 18, it is considered to simply use the tape 10 as a cryogenic label, for information to be inscribed onto the container 16.

The cryogenic-sealing tape 10 therefore uses Silicone Film Material (SFM) and/or Silicon Rubber Film Material (SRFM) to seal and identify containers, which may have a low temperature surface, as may be the case with vials, bottles, goblets, metal cassettes, boxes, freezer racks freshly removed from a freezing or a cryogenic environment. Furthermore, the tape 10 may be used on containers that are sealed or identified at ambient or above cryogenic temperatures to then subsequently be exposed to cryogenic temperatures around −80° C. or below. The use of silicone and silicone-containing materials without adhesive eliminates any concerns of adhesive toxicity for samples, as no adhesive is added onto the tape 10.

The silicone or silicone containing material of the tape 10 gives it the capability of being applied over an alcohol-wet or disinfectant-wet surface and create a hermetic seal to maintain a long-term sterile environment underneath the formed seal. The silicone and silicone-rubber tape is not affected by alcohol or even by harsher chemicals such as xylene and can bond to itself and remain bonded while it is soaked in alcohol. This has positive implications for sample sterility protection in labs since it is a routine procedure to use alcohol and other disinfectants to spray samples and biological compounds and fluids to maintain their sterility. Furthermore, since the material of the tape 10 can withstand high temperatures (e.g., up to 260° C.), autoclave sterilization of containers sealed with the tape 10 is possible, thereby maintaining the sterility until the seal of tape 10 is removed. In this respect the silicone (silicone-rubber) film accomplishes two goals for any sample storage facility: i) it keeps sterility of the sample inside the liquid nitrogen storage; ii) it prevents the penetration of liquid nitrogen inside the vial during the storage. Silicone and silicone-rubber attaches to frozen metal in the manner shown in FIGS. 1A-1F, without becoming brittle or cracking. This is a feature which has not been seen with other thermoplastic films or adhesive labels made of thermoplastic films.

The tape 10 may solve challenges such as: 1) it can be applied to cryogenically frozen containers; 2) it can serve as a seal to prevent penetration of liquid nitrogen inside vials; 3) It can be applied to solvent-wet surfaces sprayed with disinfectants; 4) It is chemically inert and will not affect the integrity of samples; 5) it can be applied to frozen metal; 6) it can withstand to very high temperatures used in laboratory sterilization in autoclaves; and/or 7) it can be used for other types of sterilization, such as ethylene oxide, gamma irradiation.

The present disclosure also describes the method of sealing containers and protecting them from contamination comprising the following steps: a) spraying the container with a chemical or disinfecting solution; b) applying the cryogenic sealing tape 10 and sealing the container; c) storing the container inside an environment at −70° C. or below.

The cryogenic-sealing tape 10 may have some or all of the following properties: 1) it is stretchable, for example up to 300% or more; 2) it does not contain any layer of adhesive that was added to the material in contrast to adhesive tapes such as an electrical tape; 3) it can be handled by naked hands and it will not stick to a human skin but it can adhere to itself; 4) once it is wrapped onto itself for example by stretching and wrapping around an object, or wrapping a splice, it creates an integral bond and tight seal that cannot be unwrapped after a period of time; 5) it can be applied to surfaces such as bottle necks and cylindrical vials which have been sprayed by alcohol or other disinfectants or chemicals; 6) It may withstand cryogenic temperatures in the range from −70° C. to −196° C. 7) it may withstand storage inside liquid phase and vapour phase liquid nitrogen and dry ice; 8) It can be applied to frozen surfaces including but not limited to plastic, metal, cardboard, composite materials with a surface temperature ranging from −70° C. to −196° C. and reinserted back inside a freezer, dry ice or liquid nitrogen.

Figure 2:
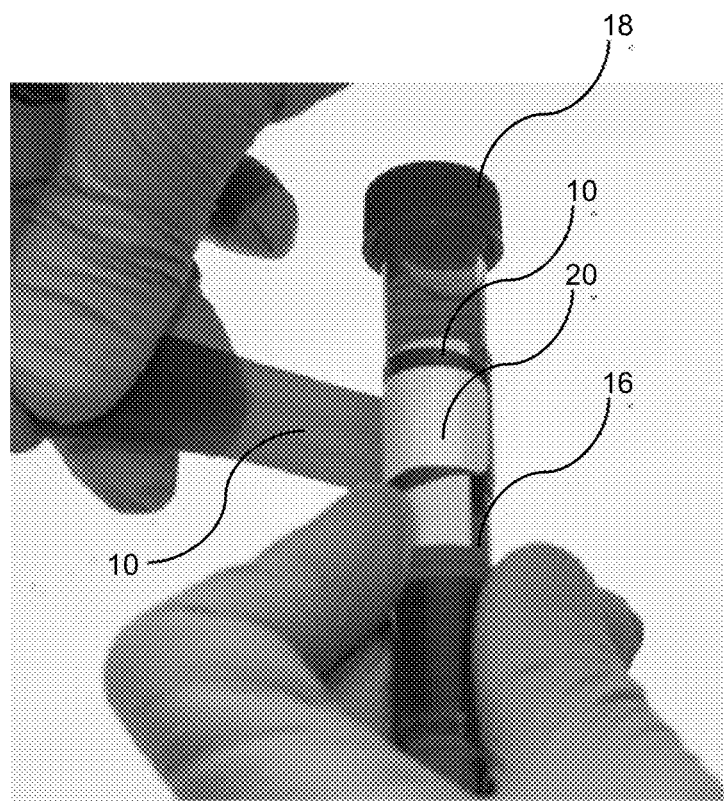
FIG. 2 is a perspective view of the cryogenic-seal tape as used to secure a wireless tag to a container, in a first embodiment.
Figure 3:
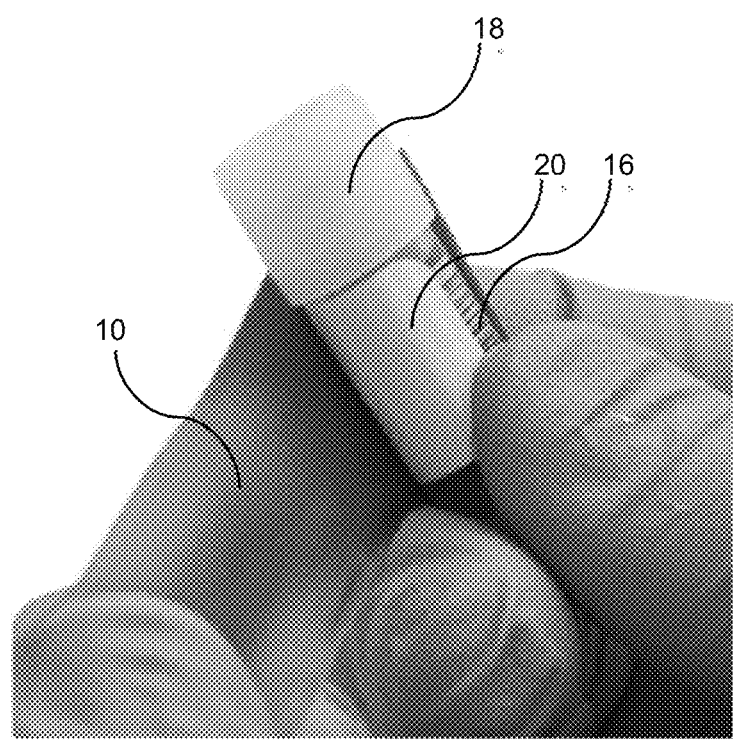
FIG. 3 is a perspective view of the cryogenic-seal tape as used to secure a wireless tag to a container, in a second embodiment.

As shown in FIGS. 2 and 3, the cryogenic-sealing tape 10 may incorporate of a wireless device 20 (a.k.a., electronic device, tag) for Radio Frequency Identification (RFID) and/or Near Field Communication (NFC) technologies, or chip. This technology allows the electronic storage and reading of the information without a physical contact with the wireless tag. According to an embodiment, as shown in FIG. 2, the wireless device 20 is positioned onto a first layer of the tape 10, with a second layer then overlaid on the first layer of tape 10, such that the wireless device 20 is sandwiched between two layers of the tape 10, and thus fully encapsulated by the tape 10. The wireless device may also be embedded in the tape 10. As shown in FIG. 3, the wireless device 20 can be applied directly against the container 16 (or lid 18) with the tape 10 wrapped onto the wireless device 10 to isolate it from the surroundings. These wireless devices 20 supported by the tape 10 may contain valuable information about the content of the container to which they are affixed.

In accordance with an embodiment of the present disclosure, the tape 10 is used as combined to the cap 18 and container 16 for sealed storage of a sample at −70° C. or below. The use may comprise a container for receiving a sample for subsequent storage of the sample at −70° C. or below. The cap 18 encloses the sample in the container 16 for subsequent storage of the sample at −70° C. or below, a joint being defined between the cap 18 and the container 16. The sealing tape 10 sealingly covers the joint between the cap 18 and the receptacle 16 during storage of the sample at −70° C. or below, the sealing tape 10 comprising a strip body having a first surface and a second surface, the first surface and the second surface being made of one of a silicone and a silicone rubber, a thickness between the first surface and the second surface ranging between 0.5 mil-60.0 mil, the strip body configured for the first surface at a first end to self-adhere to the second surface at a second end by overlaying in a silicone-to-silicone bond to cover the joint.

In accordance with a further embodiment of the present disclosure, the method for sealing a joint for exposure to an environment of 70° C. or below may comprise obtaining the sealing tape 10 comprising a strip body having a first surface and a second surface, the first surface and the second surface being made of one of a silicone and a silicone rubber, a thickness between the first surface and the second surface ranging between 0.5 mil-60.0 mil. A first end of the strip body is placed against a joint to be sealed. The strip body is wrapped and stretched body around the joint to be sealed. A silicone-to-silicone bond is formed by overlaying the second surface at a second end onto the first surface at the first end, whereby the strip body self-adheres to itself while stretched to cover the joint. The sealing tape 10 covering the joint is exposed to the environment of 70° C. or below, whereby the sealing tape seals the joint in the environment of 70° C. or below, the sealing tape maintaining its sealing integrity in the environment of 70° C. or below.

The invention claimed is:

1. A cryogenic sealing tape for exposure to −70° C. or below while sealing a joint of a container, the cryogenic sealing tape comprising a strip body having a first surface and a second surface, the first surface and the second surface being made of silicone rubber, a thickness between the first surface and the second surface ranging between 0.5 mil 60.0 mil, the strip body configured for the first surface at a first end to self-adhere to the second surface at a second end by overlaying in a silicone-to-silicone bond, the strip body further configured for the second surface at the first end to self-adhere to the first surface at the second end by overlaying in a silicone-to-silicone bond.

2. The cryogenic sealing tape of claim 1, wherein the strip body is a monolithic body of silicone or silicon rubber.

3. The cryogenic sealing tape of claim 2, further comprising printing on at least one of the first surface and of the second surface.

4. The cryogenic sealing tape of claim 1, wherein the strip body is non-continuous and divided into a section sized for the container.

5. The cryogenic sealing tape of claim 1, further comprising at least one of a radio frequency identification chip and near field communication chip embedded in the strip body or is on the strip body.

6. The cryogenic sealing tape of claim 1, wherein the strip body is in a roll, and further comprising a backing layer placed between the first surface and the second surface of the cryogenic tape in the roll.

7. A combination of a sealing tape, cap and container for sealed storage of a sample at −70° C. or below, the combination comprising:
a container for receiving a sample for subsequent storage of the sample at −70° C. or below;
a cap for enclosing the sample in the container for subsequent storage of the sample at −70° C. or below, a joint defined between the cap and the container; and
a sealing tape for sealingly covering said joint between the cap and the receptacle during storage of the sample at −70° C. or below, the sealing tape comprising a strip body having a first surface and a second surface, the first surface and the second surface being made of a silicone rubber, a thickness between the first surface and the second surface ranging between 0.5 mil 60.0 mil, the strip body configured for the first surface at a first end to self-adhere to the second surface at a second end by overlaying in a silicone-to-silicone bond to cover said joint.

8. The combination of claim 7, further comprising at least one of a disinfectant and a sterilizing solution for being sprayed on the container, on the cap and on the sealing tape prior to storage the sample at −70° C. or below.

9. The combination of claim 8, wherein the disinfectant and the sterilizing solution include at least one of alcohol, bleach, xylene.

10. The combination of claim 7, further comprising ink for labelling the sealing tape prior to storage the sample at −70° C. or below.

11. The combination of claim 7, further comprising at least one of a radio frequency identification chip and near field communication chip embedded in the strip body, retained by strip body or on the strip body.

12. The combination of claim 7, wherein the sealing tape sealingly covers said joint between the cap and the receptacle during exposure to liquid nitrogen.

13. A method for sealing a joint for exposure to an environment of −70° C. or below, comprising:
Obtaining a sealing tape comprising a strip body having a first surface and a second surface, the first surface and the second surface being made of a silicone rubber, a thickness between the first surface and the second surface ranging between 0.5 mil-60.0 mil;
Placing a first end of the strip body against a joint to be sealed;
Wrapping and stretching the strip body around the joint to be sealed;
Forming a silicone-to-silicone bond by overlaying the second surface at a second end onto the first surface at the first end, whereby the strip body self-adheres to itself while stretched to cover said joint; and
Exposing the sealing tape covering the joint to said environment of −70° C. or below, whereby the sealing tape seals the joint in said environment of −70° C. or below, the sealing tape maintaining its sealing integrity in said environment of −70° C. or below.

14. The method according to claim 13, further comprising enclosing a sample in a container and forming a joint by placing a cap onto the container.

15. The method according to claim 14, wherein obtaining the sealing tape includes obtaining the sealing tape with at least one of a radio frequency identification chip and near field communication chip embedded in the strip body, retained by the strip body or on the strip body.

16. The method according to claim 15, further comprising removing the container with the sealing tape from said environment of −70° C. or below, and obtaining an identification of the container via the radio frequency identification chip or the near field communication chip embedded in the strip body.

17. The method according to claim 14, further comprising applying an ink on the sealing tape to identify the container or its content.

18. The method according to claim 14, further comprising applying at least one of a disinfectant and sterilizing product to the container, the cap and the sealing tape.

19. The method according to claim 13, wherein stretching the strip body around the joint comprises stretching the strip body by at least 50%.

20. The method according to claim 14, wherein obtaining a sealing tape comprises unrolling a length of the sealing tape from a roll, cutting the sealing tape to define the strip body, and removing a backing layer from the strip body.

21. The method according to claim 13, wherein exposing the sealing tape covering the joint to said environment of −70° C. or below includes exposing the sealing tape to liquid nitrogen.

* * * * *